(12) United States Patent
Abaya et al.

(10) Patent No.: US 9,582,134 B2
(45) Date of Patent: Feb. 28, 2017

(54) BUILDING APPLICATIONS FOR CONFIGURING PROCESSES

(71) Applicant: Ab Initio Technology LLC, Lexington, MA (US)

(72) Inventors: Victor Abaya, Cambridge, MA (US); Joyce L. Vigneau, Stoneham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 554 days.

(21) Appl. No.: 13/764,998

(22) Filed: Feb. 12, 2013

(65) Prior Publication Data

US 2014/0229846 A1    Aug. 14, 2014

(51) Int. Cl.
    *G06F 3/00*     (2006.01)
    *G06F 9/00*     (2006.01)
    (Continued)

(52) U.S. Cl.
    CPC ............... *G06F 3/0481* (2013.01); *G06F 8/34* (2013.01); *G06F 8/38* (2013.01); *G06F 9/4443* (2013.01); *G06F 9/44505* (2013.01)

(58) Field of Classification Search
    CPC ........ G06F 9/4443; G06F 8/34; G06F 3/0486; G06F 8/38; G06F 3/0481; G06F 3/0482; G06F 3/04812; G06F 3/04847; G06Q 10/10
    See application file for complete search history.

(56) References Cited

U.S. PATENT DOCUMENTS

| | | | |
|---|---|---|---|
| 4,901,221 A | 2/1990 | Kodosky et al. | |
| 4,914,568 A | 4/1990 | Kodosky et al. | |

(Continued)

FOREIGN PATENT DOCUMENTS

| | | |
|---|---|---|
| CN | 1961313 | 5/2007 |
| CN | 101000621 | 7/2007 |

(Continued)

OTHER PUBLICATIONS

Transaction History, U.S. Appl. No. 12/959,985, Jul. 11, 2013, 1 page.

(Continued)

*Primary Examiner* — Kieu Vu
*Assistant Examiner* — Anita D Chaudhuri
(74) *Attorney, Agent, or Firm* — Wolf, Greenfield & Sacks, P.C.

(57) ABSTRACT

Methods, systems, and apparatus, including computer programs encoded on computer storage media, for specifying a user interface. One of the methods includes receiving an identification of at least one configurable application, each configurable application being configurable by one or more parameters. The method includes identifying a set of parameters associated with the at least one configurable application. The method includes displaying, in a second user interface, a graphical display element, the graphical display element having properties and associated with a location relative to the first user interface. The method includes displaying, in the second user interface, one or more graphical representations of the set of parameters. The method includes receiving a mapping between a property of the graphical display element and a parameter of the set of parameters. The method also includes storing a representation of the mapping and the location.

18 Claims, 10 Drawing Sheets

(51) Int. Cl.
  *G06F 17/00* (2006.01)
  *G06F 3/0481* (2013.01)
  *G06F 9/44* (2006.01)
  *G06F 9/445* (2006.01)

(56) References Cited

U.S. PATENT DOCUMENTS

| | | | |
|---|---|---|---|
| 5,291,587 | A | 3/1994 | Kodosky et al. |
| 5,301,336 | A | 4/1994 | Kodosky et al. |
| 5,438,659 | A | 8/1995 | Notess et al. |
| 5,481,741 | A | 1/1996 | McKaskle et al. |
| 5,844,554 | A | 12/1998 | Geller et al. |
| 5,966,072 | A | 10/1999 | Stanfill et al. |
| 6,064,812 | A | 5/2000 | Parthasarathy et al. |
| 6,102,965 | A | 8/2000 | Dye et al. |
| 6,173,438 | B1 | 1/2001 | Kodosky et al. |
| 6,219,628 | B1 | 4/2001 | Kodosky et al. |
| 6,437,805 | B1 | 8/2002 | Sojoodi et al. |
| 6,694,321 | B1 | 2/2004 | Berno |
| 6,763,515 | B1 | 7/2004 | Vazquez et al. |
| 6,801,229 | B1 * | 10/2004 | Tinkler ............... 715/853 |
| 7,120,876 | B2 | 10/2006 | Washington et al. |
| 7,164,422 | B1 | 1/2007 | Wholey, III et al. |
| 7,167,850 | B2 | 1/2007 | Stanfill |
| 7,281,018 | B1 | 10/2007 | Begun et al. |
| 7,701,869 | B2 | 4/2010 | Hogan |
| 7,756,907 | B2 | 7/2010 | Stolte et al. |
| 7,895,586 | B2 | 2/2011 | Ozone |
| 7,937,665 | B1 | 5/2011 | Vazquez et al. |
| 8,156,481 | B1 | 4/2012 | Koh et al. |
| 2001/0020291 | A1 | 9/2001 | Kudukoli et al. |
| 2001/0024211 | A1 | 9/2001 | Kudukoli et al. |
| 2001/0034733 | A1 | 10/2001 | Prompt et al. |
| 2001/0047402 | A1 | 11/2001 | Saimi et al. |
| 2002/0170042 | A1 | 11/2002 | Do et al. |
| 2003/0172193 | A1 | 9/2003 | Olsen |
| 2003/0174165 | A1 * | 9/2003 | Barney ............... 345/747 |
| 2003/0195867 | A1 | 10/2003 | Nye |
| 2004/0015783 | A1 | 1/2004 | Lennon et al. |
| 2004/0034848 | A1 | 2/2004 | Moore et al. |
| 2004/0044912 | A1 | 3/2004 | Connary et al. |
| 2004/0093342 | A1 * | 5/2004 | Arbo et al. ............... 707/102 |
| 2004/0181543 | A1 | 9/2004 | Wu et al. |
| 2004/0187079 | A1 | 9/2004 | Yamada et al. |
| 2004/0210445 | A1 | 10/2004 | Veronese |
| 2004/0239674 | A1 | 12/2004 | Ewald et al. |
| 2005/0060647 | A1 | 3/2005 | Doan et al. |
| 2005/0066285 | A1 | 3/2005 | Santori et al. |
| 2005/0114369 | A1 | 5/2005 | Gould et al. |
| 2005/0193097 | A1 | 9/2005 | Guthrie et al. |
| 2005/0246717 | A1 | 11/2005 | Poole et al. |
| 2005/0257195 | A1 | 11/2005 | Morrow et al. |
| 2005/0257198 | A1 | 11/2005 | Stienhans et al. |
| 2005/0283478 | A1 | 12/2005 | Choi et al. |
| 2005/0289356 | A1 | 12/2005 | Shoham |
| 2006/0036745 | A1 | 2/2006 | Stienhans et al. |
| 2006/0095466 | A1 | 5/2006 | Stevens et al. |
| 2006/0129690 | A1 | 6/2006 | Hill et al. |
| 2006/0179150 | A1 | 8/2006 | Farley et al. |
| 2007/0011668 | A1 | 1/2007 | Wholey et al. |
| 2007/0073712 | A1 | 3/2007 | Falk et al. |
| 2007/0079286 | A1 | 4/2007 | Cook et al. |
| 2007/0150429 | A1 | 6/2007 | Huelsman et al. |
| 2007/0192863 | A1 | 8/2007 | Kapoor et al. |
| 2007/0233655 | A1 | 10/2007 | Engels |
| 2007/0239628 | A1 | 10/2007 | Peck et al. |
| 2007/0256053 | A1 * | 11/2007 | Torgerson et al. ............ 717/110 |
| 2007/0271381 | A1 | 11/2007 | Wholey et al. |
| 2007/0276689 | A1 | 11/2007 | Slone et al. |
| 2007/0294213 | A1 | 12/2007 | Hacigumus et al. |
| 2008/0049022 | A1 | 2/2008 | Sherb et al. |
| 2008/0091491 | A1 | 4/2008 | Thorpe et al. |
| 2008/0256014 | A1 | 10/2008 | Gould et al. |
| 2008/0263386 | A1 | 10/2008 | Darrington et al. |
| 2008/0270920 | A1 | 10/2008 | Hudson |
| 2009/0006454 | A1 | 1/2009 | Zarzar et al. |
| 2009/0083313 | A1 | 3/2009 | Stanfill et al. |
| 2009/0319494 | A1 | 12/2009 | Gooder |
| 2009/0327196 | A1 | 12/2009 | Studer et al. |
| 2010/0235495 | A1 | 9/2010 | Petersen et al. |
| 2010/0262902 | A1 | 10/2010 | Burns |
| 2011/0145748 | A1 * | 6/2011 | Farver et al. ............... 715/771 |

FOREIGN PATENT DOCUMENTS

| | | |
|---|---|---|
| JP | 2004/516529 | 6/2004 |
| WO | WO 01/95088 A1 | 12/2001 |
| WO | WO 01/95089 A1 | 12/2001 |
| WO | WO 02/11344 | 2/2002 |
| WO | WO 2006/091624 | 8/2006 |
| WO | WO 2007/076509 | 7/2007 |

OTHER PUBLICATIONS

Transaction History, U.S. Appl. No. 12/705,129, Jul. 11, 2013, 2 pages.
U.S. Appl. No. 12/959,985, filed Dec. 3, 2010, Specifying User Interface Elements.
U.S. Appl. No. 12/705,129, filed Feb. 12, 2010, Communicating with Data Storage Systems.
Chinese Office Action, with English Translation, application No. 201080016467.5, mailed Sep. 23, 2013, 64 pages.
International Search Report and Written Opinion issued in PCT/US2014/15580, mailed Jul. 8, 2014 (9 pages).
Chinese Office Action, English Translation, application No. 201080016467.5, mailed Jul. 17, 2014, 37 pages.
Japanese Office Action, with English Translation, application No. 2012-543166, mailed Oct. 30 2014, 5 pages.
Danikauskas, Tomas, et al., "Graphical User Interface Development on the Basis of Data Flows Specification." Computer and Information Sciences—ISCIS 2005 Lecture Notes in Computer Science, Jan. 1, 2005, pp. 904-914.
International Search Report & Written Option issued in PCT application PCT/US2010/058875, mailed Apr. 13, 2011, 13 pages.
International Search Report & Writing Opinion issued in PCT application No. PCT/US2010/024115, mailed Apr. 16, 2010, 14 pages.
Office Action for Canadian Application No. 2,750,479, mailed May 26, 2016.
Office Action for Chinese Application No. 201080063806.5, mailed Sep. 29, 2015.
Office Action for Japanese Application No. 2012-543166, mailed Oct. 30, 2015.
Supplementary European Search Report for Application No. 14751109.1 dated Aug. 8, 2016. 4 pages.
Japanese Office Action, with Translation, for Application No. 2012-543166, mailed Jul. 25, 2016 (11 pages).
Supplemental European Search Report in connection with European Application No. 10741811.3, mailed Aug. 9, 2016 (4 pages).
European Office Action for European Application No. 14751109.1 dated Aug. 23, 2016.

* cited by examiner

BUILDING APPLICATIONS FOR CONFIGURING PROCESSES

BACKGROUND

This description relates to building applications for configuring processes.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. Dataflow graphs may be configured using parameters. A system that implements such graph-based computations is described in U.S. Pat. No. 5,966,072, EXECUTING COMPUTATIONS EXPRESSED AS GRAPHS.

SUMMARY

In one aspect, in general, a method includes receiving an identification of at least one configurable application, each configurable application being configurable by one or more parameters. The method includes identifying a set of parameters associated with the at least one configurable application. The method includes displaying, in a second user interface, a graphical display element, the graphical display element having properties and associated with a location relative to the first user interface. The method includes displaying, in the second user interface, one or more graphical representations of the set of parameters. The method includes receiving a mapping between a property of the graphical display element and a parameter of the set of parameters. The method also includes storing a representation of the mapping and the location.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The mapping may include at least one calculation applied to the value of the property. The methods may include testing whether a first data type associated with the property is compatible with a second data type associated with the parameter. The methods may include receiving at least one condition that must be satisfied to display the graphical display element to a user of the first user interface. The methods may include receiving a mapping between a variable and a property of the graphical display element. The methods may include generating a mapping between a predetermined property of the graphical display element and the parameter in response to receiving a selection of the graphical display element and the parameter. The configurable application may process a flow of data using a plurality of components and a plurality of links connecting the components, and the methods may include identifying a link of the plurality of links; receiving a mapping between a property of a second graphical display element and the link; and storing the mapping such that the graphical display element displays the flow of data at the link to a user of the first user interface.

Aspects can include one or more of the following advantages. Understanding of the configuration processes can be improved by presenting a-what-you-see-is-what-you-get (WYSIWYG) view. Multiple dataflow graphs may be configured with in a central location. A developer can work with multiple metadata sources (for example, parameters on graphs/plans, variables used for internal/temporary storage, external files, databases, etc.).—In certain cases (such as when working with graphs) where the user needs to select vertices or edges of a data-flow application, the developer provides explicit graphical support for identifying the said vertices/edges. Templates can be searched using a graphical user interface. Errors can be identified and highlighted. The internal storage details of a configuration interface can be hidden. A developer of a builder interface can enable a user of the configuration interface to instruct the one or more dataflow graphs to partially execute in order to show the user additional information that may help them to make configuration choices.

Other features and advantages of the invention will become apparent from the following description, and from the claims.

DESCRIPTION

Data flow graphs and other configurable applications can be customized for different scenarios based on a set of parameters. A user interface, referred to as a configuration interface can set the parameters for the data flow graph. The configuration interface allows a non-expert to configure a data flow graph. In order to facilitate the creation of a configuration interface, a user interface, referred to as a builder interface, identifies parameters associated with a generic dataflow graph and enables a developer to create a configuration interface by mapping graphical user interface (GUI) controls to the parameters.

Figure 1:
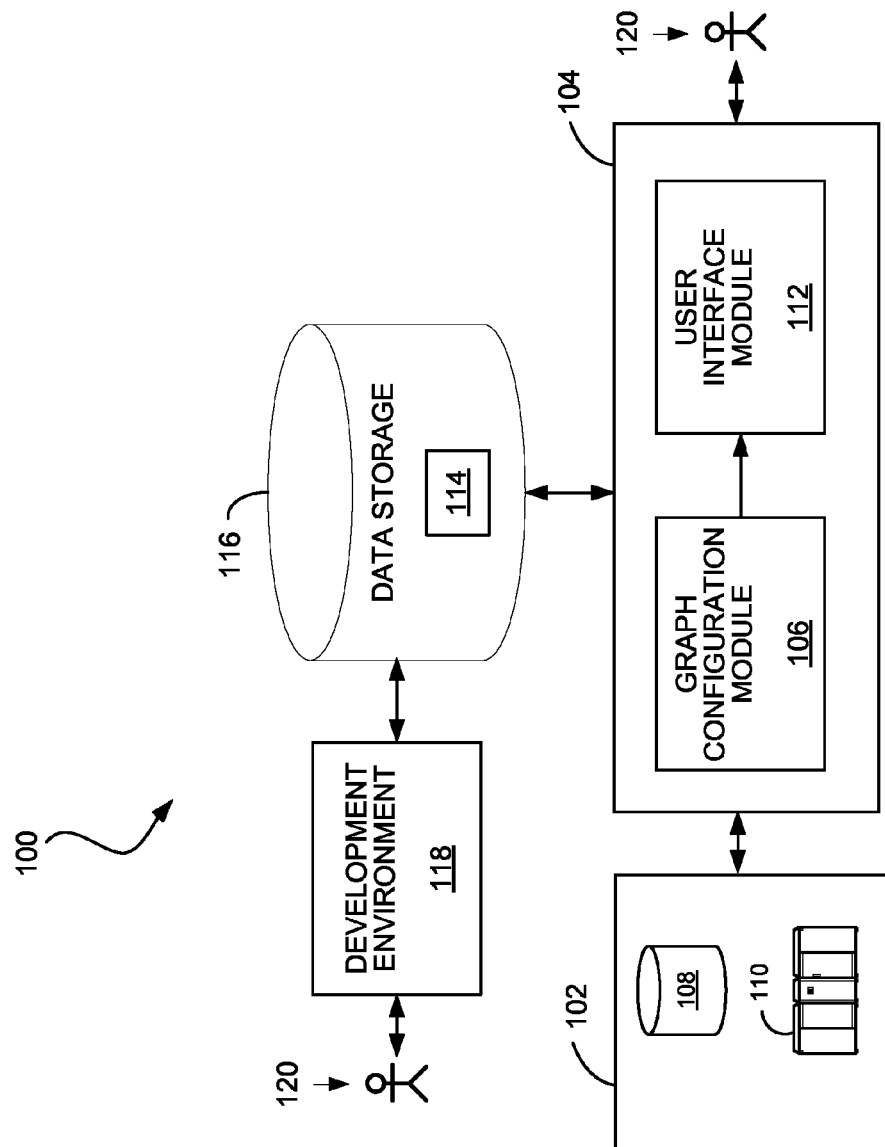
FIG. 1 shows an exemplary data processing system for building applications to configure dataflow graphs.

FIG. 1 shows an exemplary data processing system 100 for building applications to configure dataflow graphs. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a graph configuration module 106 and a user interface module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The graph configuration module 106 changes the configuration of dataflow graphs, as described in more detail below. The user interface module 112 displays configuration information to a user 120 and receives configuration actions from the user 120. The user interface module 112 also communicates with the graph configuration module 106, which configures dataflow graphs based on the actions of the user 120. For example, the dataflow graphs can be stored in the data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104 over a local or wide area data network.

The execution environment 104 is in communication with a data storage system 116 which contains information used by the user interface module 112 to display a user interface. The data storage system 116 is also accessible to a development environment 118 in which a developer 120 is able to develop user interfaces, stored in the data storage system 116, that are used by the user interface module 112 to display a user interface.

The data source 102 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "MANAGING PARAMETERS FOR GRAPH-BASED APPLICATIONS," incorporated herein by reference.

A dataflow graph can be considered a computer program executed within a dataflow graph execution environment that processes data from one or more data sources. The data from the data sources are manipulated and processed according to the dataflow graph and exported to one or more data sinks. Data sources and sinks can include files, databases, data streams, or queues, for example. Dataflow graphs are represented as directed graphs including nodes representing data processing components each including code for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different sources and sinks to be substituted readily, for example. Furthermore, in some arrangements, the flow of the dataflow graph may be altered by the use of parameters, such that a component or a series of components may be bypassed. In general, a parameter represents a property of a dataflow graph that can be configured or changed. An example of a property is, for example, "input file" the value of which identifies a data file that acts as a data source for the dataflow graph. The property can be changed between uses of the dataflow graph, and the dataflow graph may perform operations differently as a result of the change.

Figure 2:
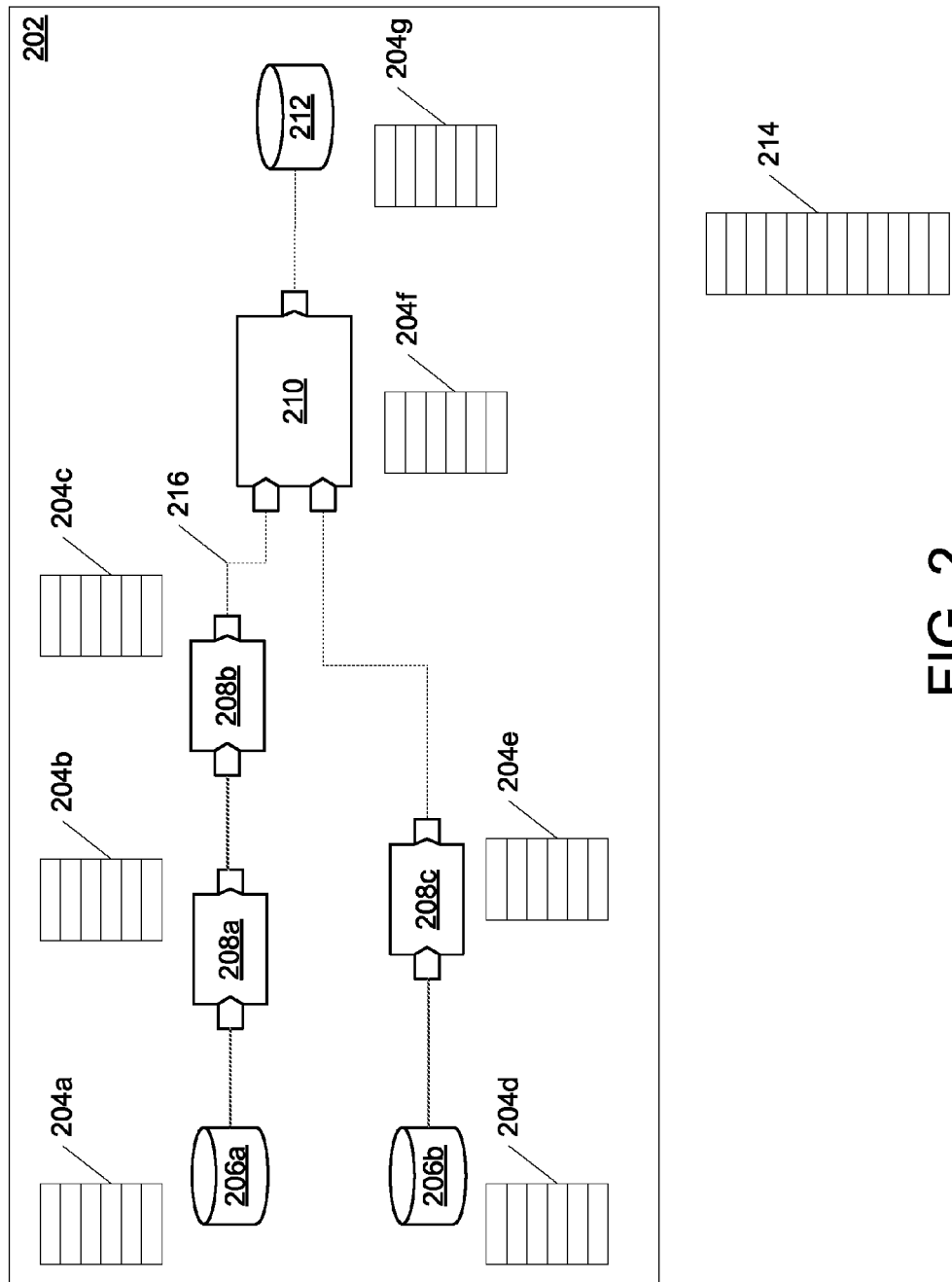
FIG. 2 illustrates a generic dataflow graph and associated parameters.

For example, referring to FIG. 2 a dataflow graph 202 may include data sources 206a, 206b, components 208a-c, 210 and a data sink 212. Each of the sources, components, and the sink may be associated with a set of parameters 204a-g. A parameter for one source, component, or sink may be used to evaluate a parameter for a different source, component, or sink. In this example, the sources 206a, 206b are connected to the input ports of components 208a, 208c. The output port of component 208a is connected to the input port of component 208b, and the output port of component 210 is connected to data sink 212. The connections between the sources, components, and sinks define the data flow.

Some of the data sources, components, or sinks may have input parameters 204a-g which may define some of the behavior of the graph. For example, a parameter may define the location of the data source or sink on a physical disk. A parameter may also define the behavior of a component, for example, a parameter may define how a sorting component sorts the input. In some arrangements, the value of one parameter may depend upon the value of another parameter. For example, a source 206a may be stored in a file in a particular directory. The parameter set 204a may include a parameter called "DIRECTORY" and another called "FILENAME". In this case the FILENAME parameter would depend upon the DIRECTORY parameter. (e.g., DIRECTORY may be "/usr/local/" and FILENAME may be "/usr/local/input.dat"). Parameters may also depend upon the parameters for other components. For example, the physical location of a sink 212 may depend upon the physical location of the source 206a. In this example, the sink 212 includes a set of parameters 204g which includes a FILENAME parameter which depends upon the DIRECTORY parameter of the source 206a. (e.g., the FILENAME parameter in the set 204g may be "/usr/local/output.dat" where the value "/usr/local/" is obtained from the DIRECTORY parameter in the set 204a.).

In some implementations, the parameters sets 204a-g may be combined into a single parameter set that contains the parameters for the entire dataflow graph, for example, the parameter set 214. This parameter set may be published or otherwise made available for use in a development environment, for example, the development environment 118 of FIG. 1. The published parameter set may be referred to as part of an application programing interface (API) of the dataflow graph.

Within the configuration interface on the client device, the parameters of the parameter sets 204a-204g or the parameter set 214 may be reorganized into different groups for interacting with a user, which reflect business considerations rather than technical ones. The configuration interface for receiving values for the parameters based on user input can display different parameters according to relationships among the parameters in a flexible way that is not necessarily restricted by aspects of the development environment on the server.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse. A configuration interface for identification of parameter values for constructing a dataflow graph can be presented on a client machine. For example, such an environment is described in more detail in U.S. Publication No. 2011/0145748, entitled "SPECIFYING USER INTERFACE ELEMENTS," incorporated herein by reference.

A configuration interface can also be used to configure execution flow graphs. An execution flow graph is a directed graph that describes an order in which external processes are to be executed. For example, an execution flow graph can specify the order in which a sequence of data flow graphs are to be executed.

The development of the configuration interface for identification of parameter values for constructing a dataflow graph can also be highly technical in nature in some cases. As described above, the underlying graphs are often constructed based on technical considerations, while the configuration interface is often developed based on business considerations. As a consequence, a configuration interface may provide parameters for one or more data flow graphs. Each dataflow graph has a separate parameter set provided by the API. Further, the development of the configuration interface includes different skills from the development of the underlying data flow graph. Therefore, the development of the configuration interface requires a combination of technical, business, and usability considerations.

To facilitate the generation of a configuration interface, a builder interface may be presented to a user of a client machine. The builder interface may be part of the development environment 118.

Figure 3:
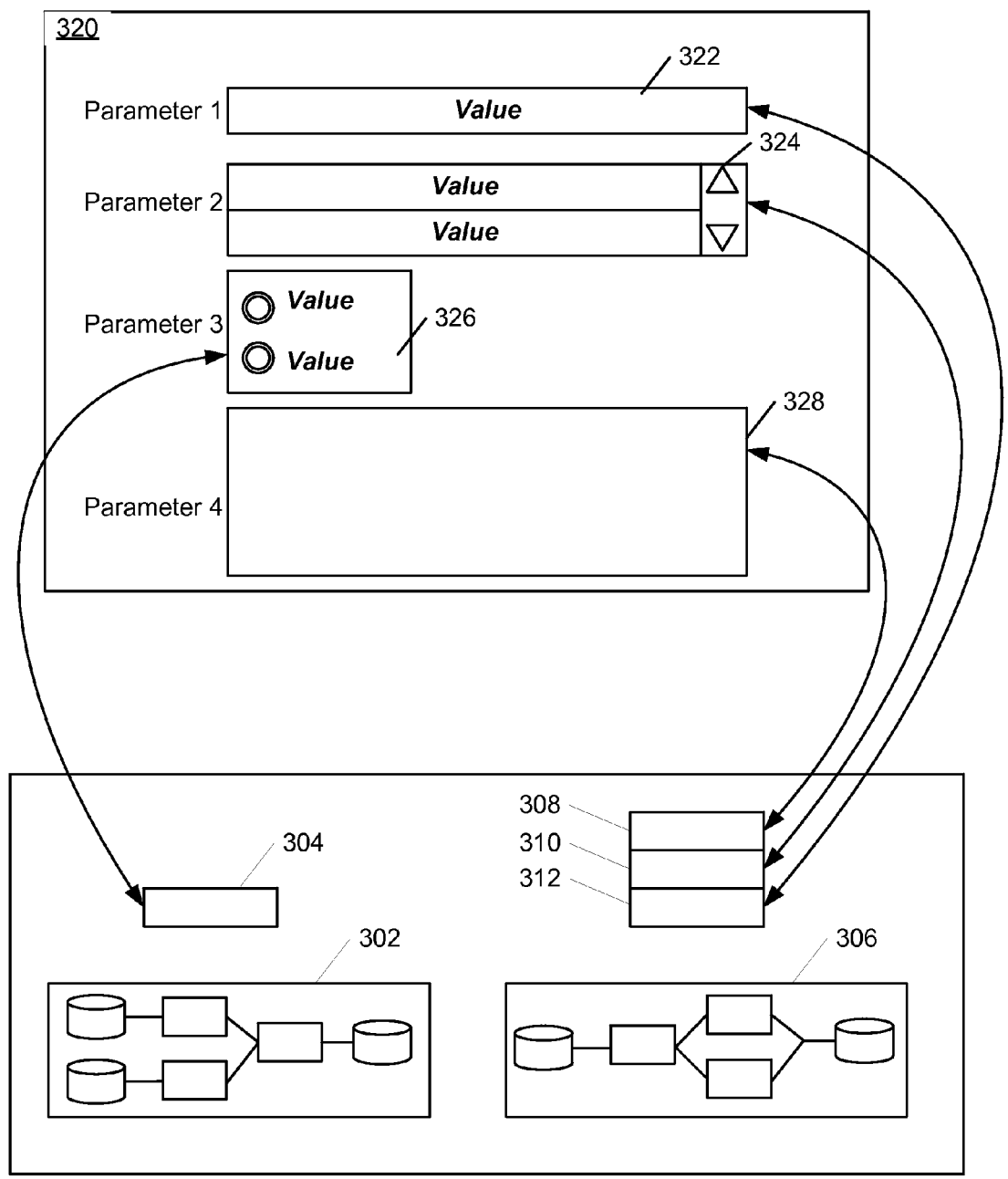
FIG. 3 illustrates an exemplary configuration interface.

FIG. 3 illustrates an exemplary configuration interface. In this example, two data flow graphs 302, 306, shown in the interface 300, are associated with the configuration interface 320. Dataflow graph 302 can be configured using parameter 304. Similarly, dataflow graph 306 can be configured using parameters 308, 310, 312.

A configuration interface 320 allows a user, for example, a user having business knowledge of the data to be processed by the dataflow graphs, to assign values to the parameters and thereby configure both dataflow graphs using a single configuration interface. In this example, the configuration interface 320 includes a parameter 1 field 322. The parameter 1 field is used to assign a value to the parameter 312 represented in the interface 300. Similarly, a parameter 2 field 324 is used to assign a value to parameter 310. A parameter 3 field is used to assign a value to parameter 304. A parameter 4 field 328 is used to assign a value to parameter 308.

The parameter fields can be selected based on the type of data to be entered. For example, the parameter 1 field 322 is a textbox that allows the user to enter any value (e.g., integers, floating point values, etc.). The parameter 2 field 324 is a list box that allows the user to select a value from a list. The parameter 3 field 326 is a radio button box that allows a user to select a value from a small number of options (in this example, two option values). The parameter 4 field 328 is a larger textbox that allows a user to enter a larger amount of text.

Other GUI controls can be selected. For example, a user may be able to open a file selector to select a particular input file or to select a location from which the file is to be downloaded over a network.

Figure 4:
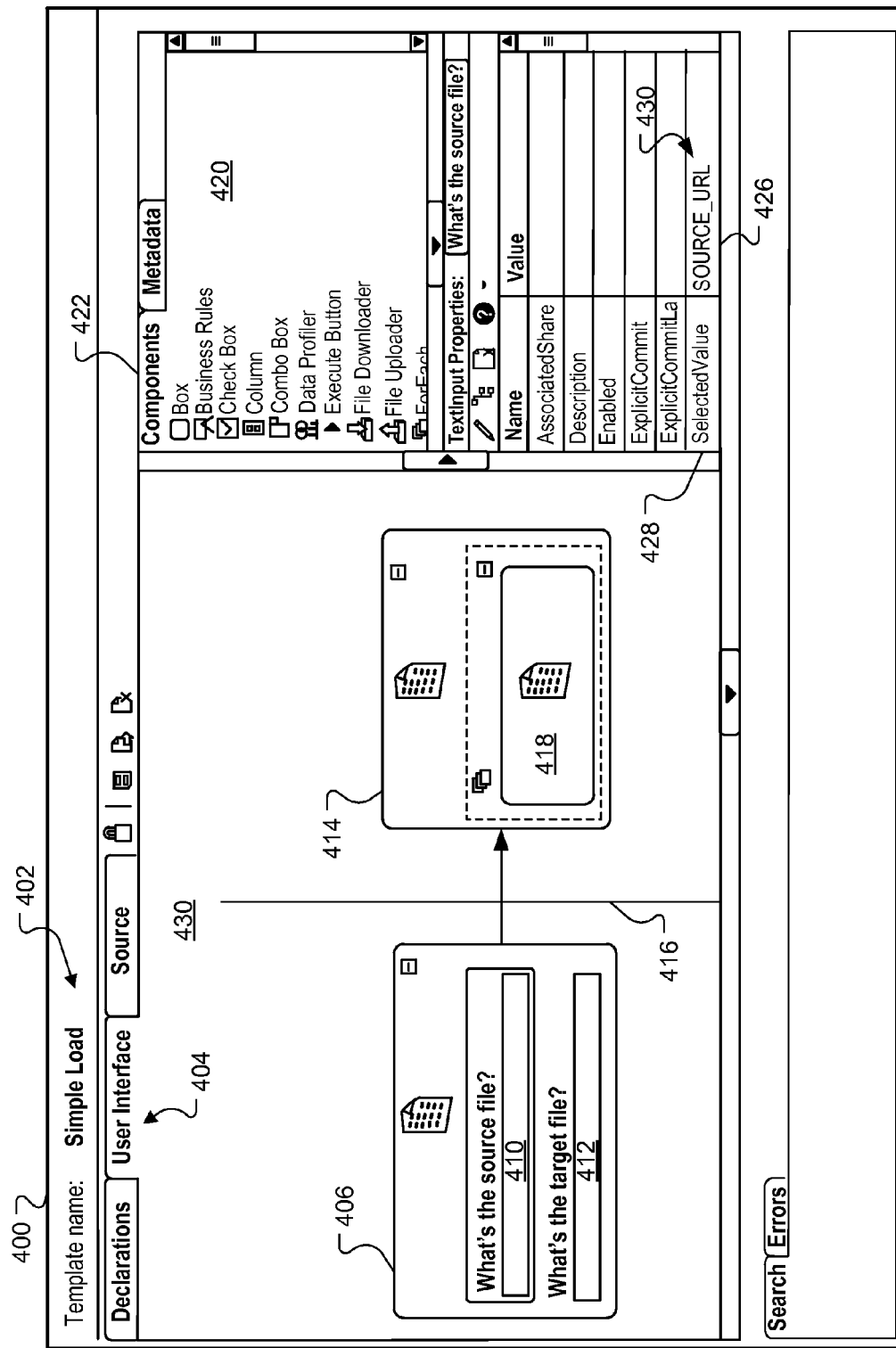
FIG. 4 illustrates an example of a builder interface for creating configuration interfaces with a focus on graphical user interface controls.

FIG. 4 illustrates an example of a builder interface 400 for creating configuration interfaces with a focus on GUI controls. The builder interface 400 includes a template name 402. The template name 402 identifies the configuration interface that is being created. A user interface tab 404 of the builder interface 400 includes a display area 430. The display area presents a "what you see is what you get" (WYSIWYG) interface for the construction of the configuration interface. The display area 430 may be thought of as a canvas upon which the developer places GUI controls. A developer can select a GUI control from the components section 422 and add it to the display area 430 to create a configuration interface. In this example, the display area 430 includes a box control 406 which includes a text input control 410 corresponding to a source file and a text input control 412 corresponding to a target file. The display area 430 also includes a box control 414 that includes a file selector control 418. The display area may partition the GUI into sections using dividers, such as divider 416.

The component section 422 includes the different controls that can be added to the display area 420. Available GUI controls include input controls which accept user input and assign values to parameters. Available GUI controls also include grouping controls, such as a box, that creates a visual outline grouping one or more controls. A developer may also select rules based controls that enable a developer to create inter-field dependencies. For example, a business rules control enables a developer to configure a parameter that provides a mapping between the output of the business rules control and a parameter that is used to configure the generic application. A developer may also select data-based controls that enable a user of the configuration interface to view the data produced by the graph. For example, referring to FIG. 2, the link 216 is associated with a flow of data from the component 208b to the component 210. Referring again to FIG. 4, the link 216 may be presented in the builder interface 400 and bound to a view data control (not shown). The view data control allows the user of the configuration interface to view data at the link 216. This enables the user of the configuration interface to quickly ascertain the effect of changing parameters.

Each control can have one or more attributes. These attributes may be displayed in a control attribute area 426. In this example, the control attribute area 426 displays attributes for the text input control 410. The control attribute area 426 enables a user to assign a parameter value to any of the property values for a control. For example, the selected value property 428 provides the value for the SOURCE_URL parameter 430.

The developer can also establish rules that dictate other graphical characteristics of the configuration interface. For example, a developer may specify that a particular GUI control not be displayed unless a predefined set of criteria is met, for example, the target file control 412 may not display unless the source file control 410 is populated.

Figure 5A:
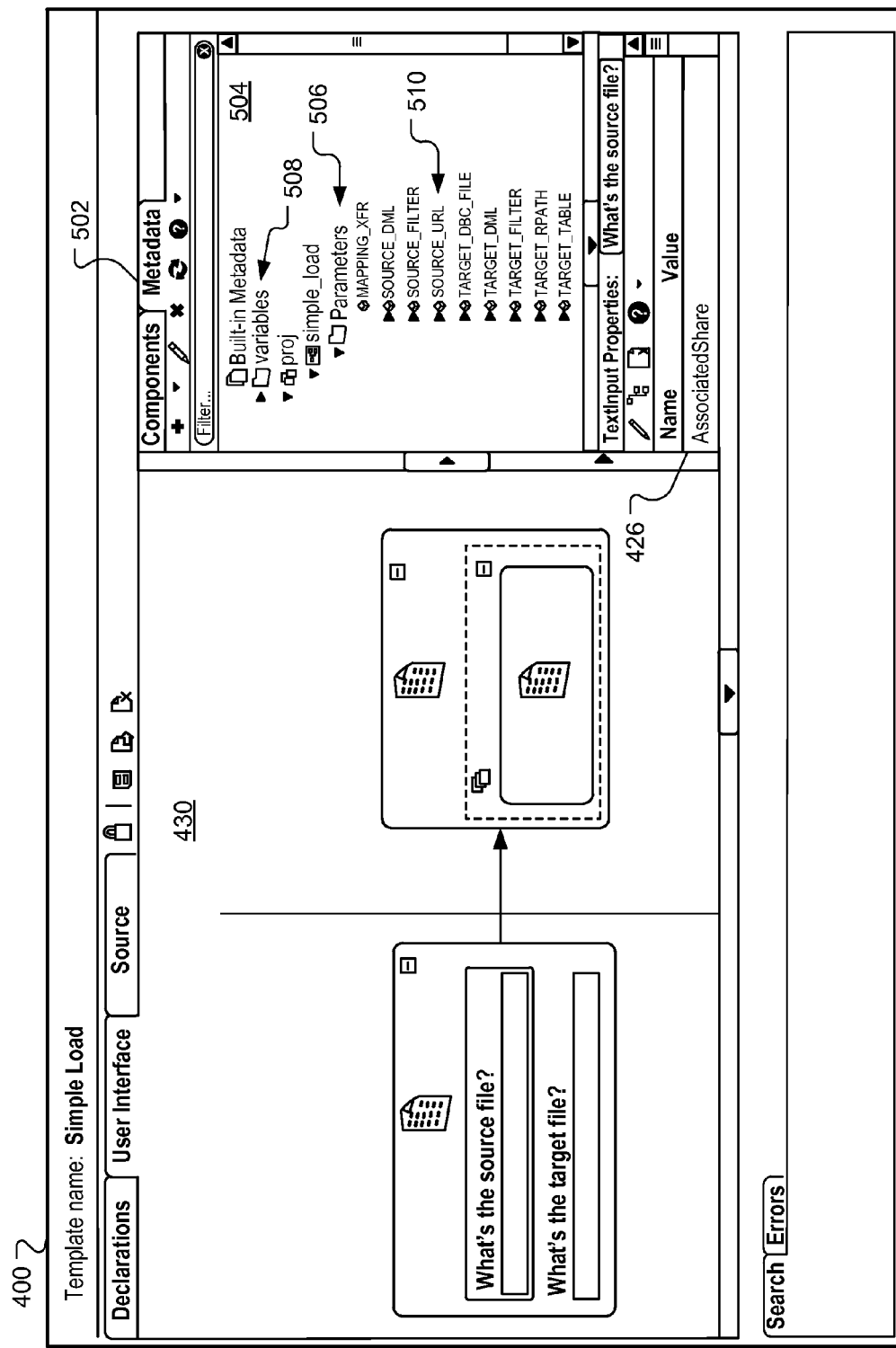
FIG. 5A illustrates an example of a builder interface for creating configuration interfaces with a focus on parameter data.

FIG. 5A illustrates an example of a builder interface 400 for creating configuration interfaces with a focus on metadata. A metadata section 502 can include, for example, variables used by the configuration interface, parameters of the graph or plans, and a list of links that describe the flow of data between components of a data flow graph. A metadata display area 504 includes a list of variables 508 that can be used to calculate intermediate values, for example, by rule based controls. The metadata display area 504 also includes a list of parameters 506 which are associated with the underlying generic graphs. In this example, when a developer selects a generic graph to include in the configuration interface, the list of parameters 506 is populated with the parameters of that generic graph. In this example, the list of parameters 506 includes a MAPPING_XFR, SOURCE_DML, SOURCE_FILTER, SOURCE_URL, TARGET_DBC_FILE, TARGET_DML, TARGET_FILTER, TARGET_RPATH, and TARGET_TABLE parameters.

A developer may associate a property of a GUI control with a parameter by, for example, selecting the parameter and dragging the parameter into a GUI control displayed in the control attribute area 426. In some implementations, a parameter may be associated with a default property of a GUI control by selecting the parameter and dragging the parameter onto the GUI control displayed in the display area 430.

In some implementations, the property of the GUI control can be compared to the parameter to verify that the property and parameter are compatible. For example, the builder interface can check if the property of the GUI control is of the same data type as the parameter. The builder interface may warn about or prevent the assignment of incompatible data types. For example, the builder interface may prevent a developer from associating a date field with a file download control.

A parameter may also be associated with a calculated value. The calculated value may be determined based on a property of a GUI control or other value.

The metadata display area 204 may also include links that represent flows of data between components of a data flow graph, as discussed above. The builder interface 400 may also support metadata from different sources. For example, the metadata may include logical references to databases, external files, etc. The metadata may also include temporary variables. The temporary variables can be used in the same sort of mappings to UI object properties in the same way that parameters are used.

Figure 5B:
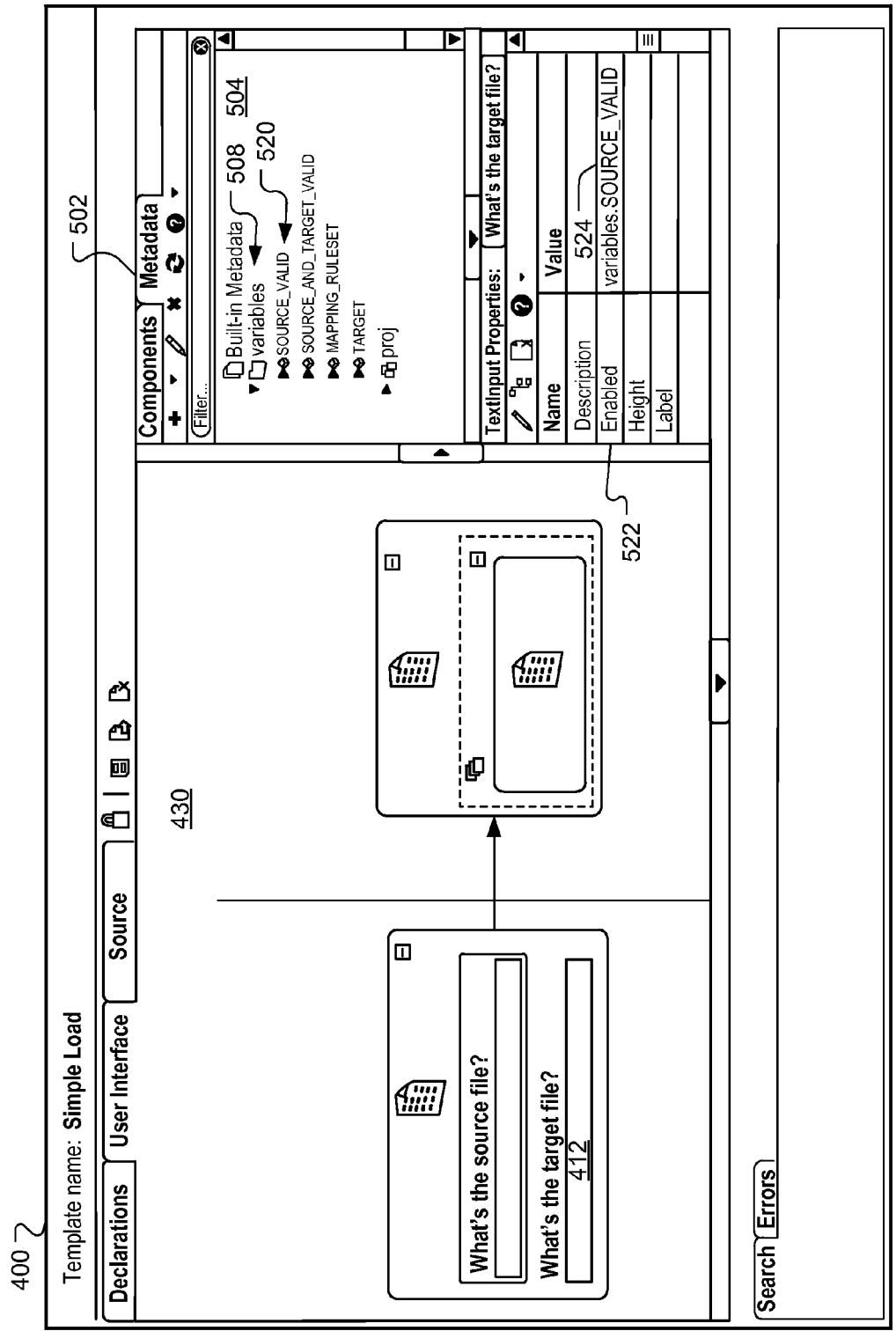
FIG. 5B illustrates an example of a builder interface for creating configuration interfaces with a focus on variable data.

FIG. 5B illustrates an example of a builder interface 400 for creating configuration interfaces with a focus on variable data. As described above, the metadata section 502 can include a list of variables 508. In this example, the list of variables includes a SOURCE_VALID variable 502, a SOURCE_AND_TARGET_VALID variables, a MAPPING_RULESET variable, and a TARGET variable.

A developer may associate an attribute of a GUI control with a variable. In this example, the enabled attribute 522 of the text input control 412 shows 524 that the enabled attribute is associated with the SOURCE_VALID variable 520. In this example, the text input control 412 is not displayed until the value of the SOURCE_VALID variable is set to "True."

Figure 5C:
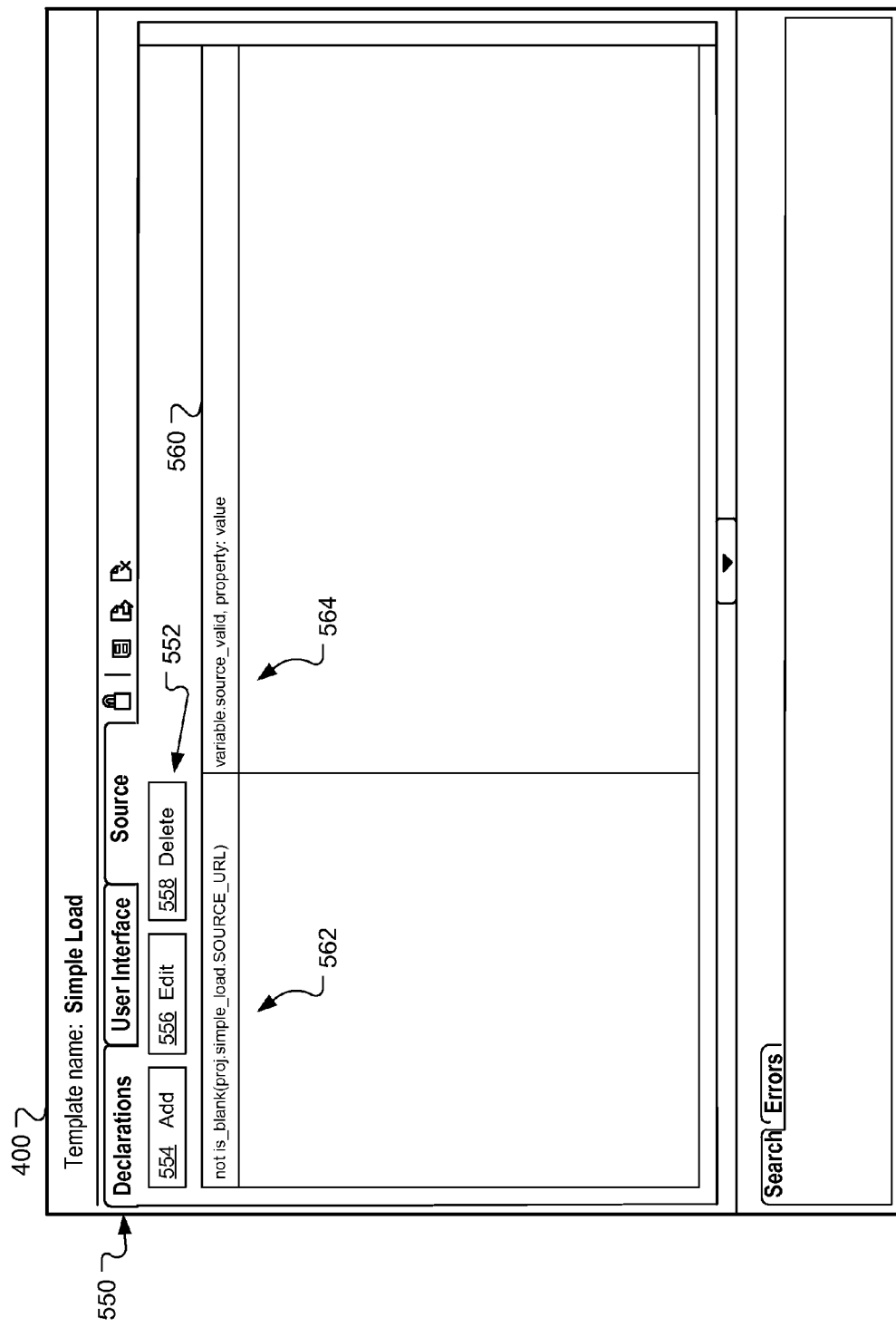
FIG. 5C illustrates an example of the automatic assignment of variables.

The value of the variable can be established using automatic assignment. FIG. 5C illustrates an example of the automatic assignment of variables. The builder interface 400 includes a declarations section 550 that enables a developer to assign dynamic values to variables. The user interface provides access to operations 552 such as Add 554, to add a new dynamic assignment, Edit 556, to change an existing dynamic assignment, and Delete 558, to delete an existing dynamic assignment.

The dynamic assignments can be displayed in a dynamic assignment display area 560. For example, the value property of the source_valid variable 564 is assigned the value of the command "not is_blank(proj.simple_load.SOURCE_URL).

Figure 6:
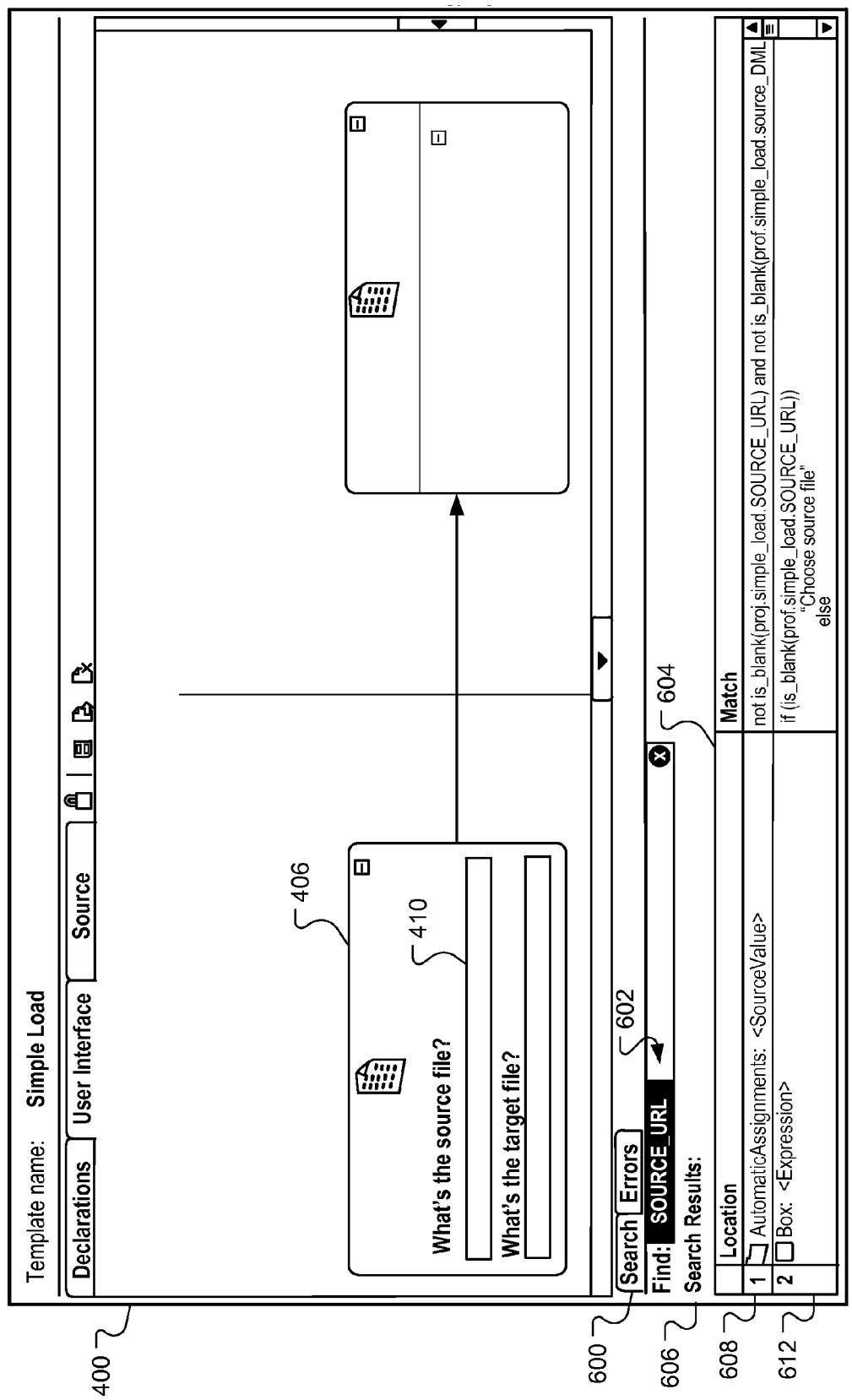
FIG. 6 illustrates search functionality in the builder interface.

FIG. 6 illustrates search functionality in the builder interface 400. A configuration interface is a complex scheme that defines rules for binding user interface controls to parameters and metadata properties. It can be difficult to locate references to the parameters and variables. For example, the developer may want to find all the places where SOURCE_URL parameter is referenced. The reference points might be in various locations (for example, part of an automatic assignment, in an expression on a GUI controls Visible property, on the SourceTargetValue property of a FileBrowser control, etc.).

A developer can enter a search term in a search field 602 on a search tab 600 of the builder interface 400. Search results are identified and presented in a search results area 606. In this example, the developer searches for "SOURCE_URL" and two search results 608, 612 are presented to the developer. In some implementation, double-clicking on a search result in the grid automatically takes the user to the specific location of the configuration template associated with the search result.

In some implementations, other visual indicators can be used to identify components associated with search results. For example, sections of the builder interface that are not associated with the search results may be dimmed or blurred. Icons may be used to provide an indication as to where the search results may be located.

Figure 7:
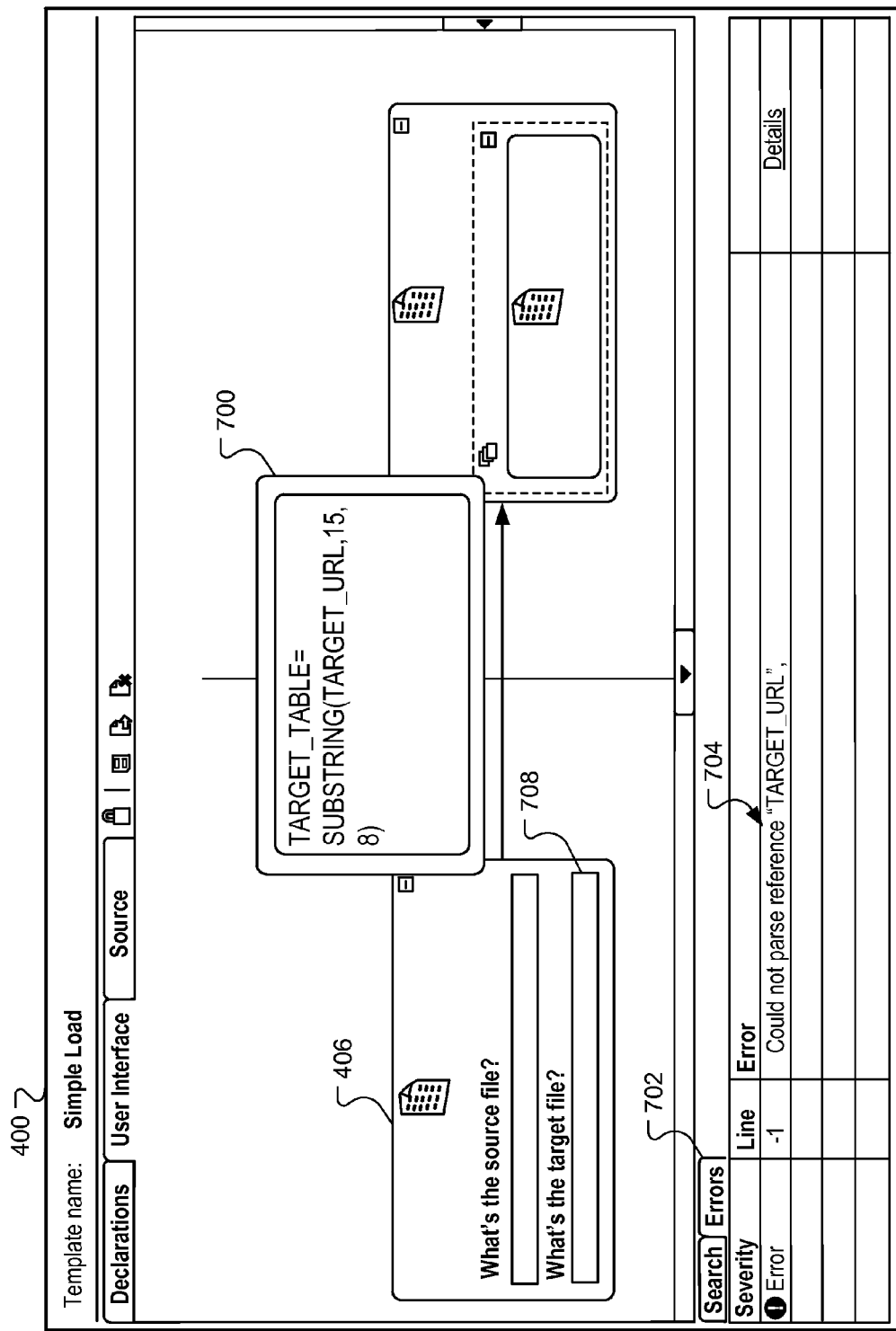
FIG. 7 illustrates error handling in the builder interface.

FIG. 7 illustrates error handling in the builder interface. Errors can be identified and displayed to a developer. In this example, a GUI window 700 includes a formula that assigns a value to a parameter. Here, the TARGET_TABLE parameter, associated with the field 708, is assigned to a substring of the TARGET_URL string.

An errors tab 702 can present any errors 704 to the developer. For example, the errors tab 702 may identify syntax errors in the calculated formula as well as type mismatch errors.

In some implementations, selecting an error on the error tab 702, for example error 704 may highlight the section of the application where the error occurs. In this example, selecting the error 704 opens the GUI window 700. In other implementations, selecting the error 704 may result in the builder interface highlighting the field 708 and/or the box control 406.

The location of errors may be identified in the manner described above with relation to search results. For example, the components that are associated with the error may be highlighted, or components not associated with the error may be dimmed. Selecting the error, for example, using a double-click, may cause the build interface to display the source of the error.

Once the configuration interface has been defined in the builder interface, the configuration interface can be stored and used to configure the generic graph. The configuration interface may be stored in, for example, an Extensible Markup Language (XML) file that can be read and rendered in another application.

Figure 8:
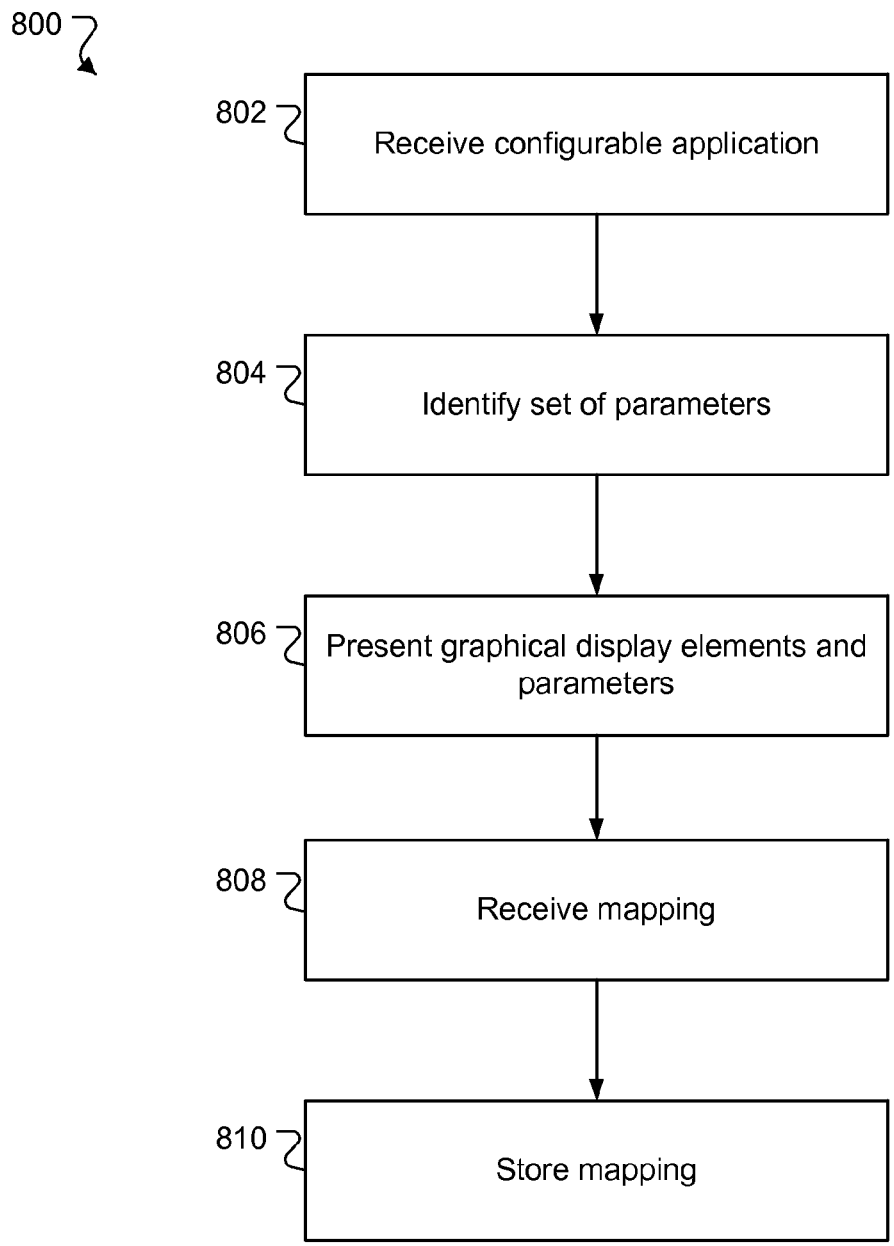
FIG. 8 is a flowchart of a process for building applications for configuring processes.

FIG. 8 is a flowchart of a process 800 for building application for configuring processes. The process can be performed by a computer system that can be part of the development environment 118 of FIG. 1. For convenience, the process will be described in relation to a system performing the process.

A selection of at least one configurable application is received 802. Each configurable application can be configured by one or more parameters. The configurable application may be, for example, a data flow graph. For example, a developer may select the configurable application from within a builder interface.

A set of parameters associated with the at least one configurable application is identified 804. The parameters may be provided as part of a public application programing interface associated with the configurable application. The parameters may also be provided in a data file.

Graphical display elements and one or more graphical representations of the set of parameters are presented 806 in a user interface. Graphical display elements can include, for example, GUI controls such as a text box, a radio box, or a list box. The graphical display elements can also include customized controls such as a file downloading control. The graphical display element is associated with a location on a configuration interface.

A mapping of a property of a graphical display element to a parameter of the set of parameters is received 808. The mapping can be determined based on the actions of a developer with a builder interface. In one implementation, the parameters may be displayed in one area of the builder interface and the GUI controls may be displayed in another area of the builder interface. The developer may select a GUI control and place the control into a display area or canvas of the builder interface. The developer may then identify a parameter that is to be associated with a property of the GUI control. For example, the developer may select the parameter and place the parameter on the GUI control or on a property of the GUI control.

A representation of the mapping and the location is stored 810. The representation may be stored, for example, in an XML file.

The application building approach described above can be implemented using software for execution on a computer. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

Other embodiments are within the scope of the following claims.

What is claimed is:

1. A computer-implemented method for specifying a first user interface for configuring a computer-executable application, the method including:
   receiving an identification of at least one configurable application;
   identifying a set of parameters associated with the at least one configurable application;
   receiving, via a second user interface, information identifying a graphical display element and specifying a location at which to place the graphical display element within the first user interface;
   displaying the graphical display element in a portion of the second user interface representing the first user interface at a location corresponding to the specified location at which to place the graphical display element within the first user interface;
   displaying, in the second user interface, one or more graphical representations of the set of parameters;
   receiving, via the second user interface, a mapping between a property of the graphical display element and a parameter of the set of parameters; and
   storing a representation of the mapping and the specified location at which to place the graphical display element within the first user interface.

2. The method of claim 1, further including testing whether a first data type associated with the property is compatible with a second data type associated with the parameter.

3. The method of claim 1, further including receiving at least one condition that must be satisfied to display the graphical display element to a user of the first user interface.

4. The method of claim 1, further including receiving a mapping between a variable and an attribute of the graphical display element.

5. The method of claim 1, wherein the at least one configurable application comprises a dataflow graph, the dataflow graph comprising components and a plurality of links connecting the components, and wherein the method further comprises:
   identifying a link of the plurality of links;
   receiving a mapping between a property of a second graphical display element and the link, wherein the second graphical display element is configured to display a flow of data at the link to a user of the first user interface.

6. The method of claim 1, wherein the at least one configurable application comprises an execution flow graph.

7. At least one non-transitory computer-readable storage medium storing instructions that, when executed by at least one processor, cause the at least one processor to perform a method for specifying a first user interface for configuring a computer-executable application, the method comprising:
   receiving an identification of at least one configurable application;
   identifying a set of parameters associated with the at least one configurable application;
   receiving, via a second user interface, information identifying a graphical display element and specifying a location at which to place the graphical display element within the first user interface;
   displaying the graphical display element in a portion of the second user interface representing the first user interface at a location corresponding to the specified location at which to place the graphical display element within the first user interface;
   displaying, in the second user interface, one or more graphical representations of the set of parameters;
   receiving, via the second user interface, a mapping between a property of the graphical display element and a parameter of the set of parameters; and
   storing a representation of the mapping and the specified location at which to place the graphical display element within the first user interface.

8. The at least one non-transitory computer-readable storage medium of claim 7, wherein the method further includes testing whether a first data type associated with the property is compatible with a second data type associated with the parameter.

9. The at least one non-transitory computer-readable storage medium of claim 7, wherein the method further includes receiving at least one condition that must be satisfied to display the graphical display element to a user of the first user interface.

10. The at least one non-transitory computer-readable storage medium of claim 7, wherein the method further includes receiving a mapping between a variable and an attribute of the graphical display element.

11. The at least one non-transitory computer-readable storage medium of claim 7, wherein the at least one configurable application comprises a dataflow graph, the dataflow graph comprising components and a plurality of links connecting the components, and wherein the method further comprises:
   identifying a link of the plurality of links;
   receiving a mapping between a property of a second graphical display element and the link, wherein the second graphical display element is configured to display a flow of data at the link to a user of the first user interface.

12. The at least one non-transitory computer-readable storage medium of claim 7, wherein the at least one configurable application comprises an execution flow graph.

13. A system for specifying a user interface for configuring a computer-executable application, the system including:
   at least one processor configured to perform:
      receiving an identification of at least one configurable application;
      identifying a set of parameters associated with the at least one configurable application;
      receiving, via a second user interface, information identifying a graphical display element and specifying a location at which to place the graphical display element within the first user interface;
      displaying the graphical display element in a portion of the second user interface representing the first user interface at a location corresponding to the specified location at which to place the graphical display element within the first user interface;
      displaying, in the second user interface, one or more graphical representations of the set of parameters;
      receiving, via the second user interface, a mapping between a property of the graphical display element and a parameter of the set of parameters; and
      storing a representation of the mapping and the specified location at which to place the graphical display element within the first user interface.

14. The system of claim 13, wherein the at least one processor is further configured to perform testing whether a first data type associated with the property is compatible with a second data type associated with the parameter.

15. The system of claim 13, wherein the at least one processor is further configured to perform receiving at least one condition that must be satisfied to display the graphical display element to a user of the first user interface.

16. The system of claim 13, further including receiving a mapping between a variable and an attribute of the graphical display element.

17. The system of claim 13, wherein the at least one configurable application comprises a dataflow graph, the dataflow graph comprising components and a plurality of links connecting the components, and wherein the method further comprises:
   identifying a link of the plurality of links;
   receiving a mapping between a property of a second graphical display element and the link, wherein the second graphical display element is configured to display a flow of data at the link to a user of the first user interface.

18. The system of claim 13, wherein the at least one configurable application comprises an execution flow graph.

* * * * *